(12) United States Patent
Malik et al.

(10) Patent No.: US 8,769,560 B2
(45) Date of Patent: Jul. 1, 2014

(54) SYSTEM AND METHOD TO OBTAIN CONTENT AND GENERATE MODIFIED CONTENT BASED ON A TIME LIMITED CONTENT CONSUMPTION STATE

(75) Inventors: Dale Malik, Dunwoody, GA (US); Nicholas Hill, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 718 days.

(21) Appl. No.: 12/577,874

(22) Filed: Oct. 13, 2009

(65) Prior Publication Data
US 2011/0088054 A1 Apr. 14, 2011

(51) Int. Cl.
*H04N 7/16* (2011.01)
*H04N 21/2343* (2011.01)
*H04N 21/6587* (2011.01)
*H04N 21/2668* (2011.01)
*G10L 15/26* (2006.01)
*G10L 13/04* (2013.01)
*H04N 21/845* (2011.01)

(52) U.S. Cl.
CPC ...... *G10L 13/043* (2013.01); *H04N 21/234336* (2013.01); *H04N 21/6587* (2013.01); *H04N 21/2668* (2013.01); *G10L 15/265* (2013.01); *H04N 21/8456* (2013.01)
USPC .............. 725/29; 725/109; 725/133; 725/141

(58) Field of Classification Search
USPC ..................... 725/29, 109, 133, 141
See application file for complete search history.

(56) References Cited

U.S. PATENT DOCUMENTS

| | | | | |
|---|---|---|---|---|
| 5,677,739 | A * | 10/1997 | Kirkland ........................ | 348/468 |
| 7,076,535 | B2 * | 7/2006 | Gupta et al. .................. | 709/219 |
| 2002/0144279 | A1 | 10/2002 | Zhou | |
| 2005/0188328 | A1 * | 8/2005 | Sezan et al. ................... | 715/789 |
| 2007/0192807 | A1 | 8/2007 | Howcroft | |
| 2008/0235741 | A1 * | 9/2008 | Ljolje et al. ...................... | 725/89 |
| 2009/0119730 | A1 * | 5/2009 | Perlman et al. ................ | 725/114 |
| 2009/0158342 | A1 * | 6/2009 | Mercer et al. ................... | 725/46 |
| 2009/0288131 | A1 * | 11/2009 | Kandekar et al. .............. | 725/133 |
| 2010/0280876 | A1 * | 11/2010 | Bowra ............................ | 705/10 |
| 2011/0281566 | A1 * | 11/2011 | Davis et al. ................ | 455/414.1 |
| 2012/0136965 | A1 * | 5/2012 | Matz ............................. | 709/217 |

* cited by examiner

*Primary Examiner* — Nnenna Ekpo
(74) *Attorney, Agent, or Firm* — Toler Law Group, PC

(57) ABSTRACT

Methods and systems to obtain content and generate modified content based on a time limited content consumption information is disclosed. In one embodiment, content may be obtained from a content source and modified based on the time limited content consumption information. In one embodiment, such modified content is stored in a memory of a content modification system and subsequently delivered to a target consumer.

17 Claims, 7 Drawing Sheets

SYSTEM AND METHOD TO OBTAIN CONTENT AND GENERATE MODIFIED CONTENT BASED ON A TIME LIMITED CONTENT CONSUMPTION STATE

FIELD OF DISCLOSURE

The present disclosure is generally related to obtaining content and generating modified content based on time limited content consumption information.

BACKGROUND

Television is frequently used as a passive medium. Viewers that are interested in viewing news programming, weather programming, traffic programming, and other programming often have a television turned on in the background as they do other things, such as preparing breakfast, packing lunches, and carrying out other activities. As a result, viewers often pay attention to programming only when content of interest to the viewer is presented.

DETAILED DESCRIPTION

Systems and methods for obtaining content and generating modified content based on time limited content consumption information are disclosed. The disclosed systems and methods may enable a provider of multimedia content to obtain and modify content on behalf of a target consumer. The content may be obtained based on predefined preferences that identify content that is of interest to the target consumer. The content may be modified based on time limited content consumption information related to the target consumer, thereby producing modified content. The time limited content consumption information of the target consumer and may be determined based on input from the target consumer. The time limited content consumption information may also be inferred based on information extracted from the content information received from external sources, such as a calendar of an electronic device of the consumer, or by any combination thereof. The modified content may subsequently be delivered to the target consumer via one or more electronic devices associated with the target consumer.

In a first particular embodiment, a system includes an interface to obtain content on behalf of a target consumer. The system is configured to modify the content to generate modified content. The modified content is generated based on time limited content consumption information of the target consumer and the modified content is stored in memory of the system.

In a second particular embodiment, a method is disclosed that includes accessing content to be delivered to a target consumer. The method also includes receiving information associated with the target consumer that indicates a time limited content consumption period. The method further includes modifying the content based on the received information to generate modified content stored in a computer memory prior to transmission.

In a third particular embodiment, a computer-readable storage medium is disclosed that includes operational instructions that, when executed by a processor, cause the processor to obtain content on behalf of a target consumer. The instructions, when executed by the processor, further cause the processor to modify the content based on time limited content consumption information associated with the target consumer to produce modified content and to send the modified content to a device associated with the target consumer for playback.

Figure 1:
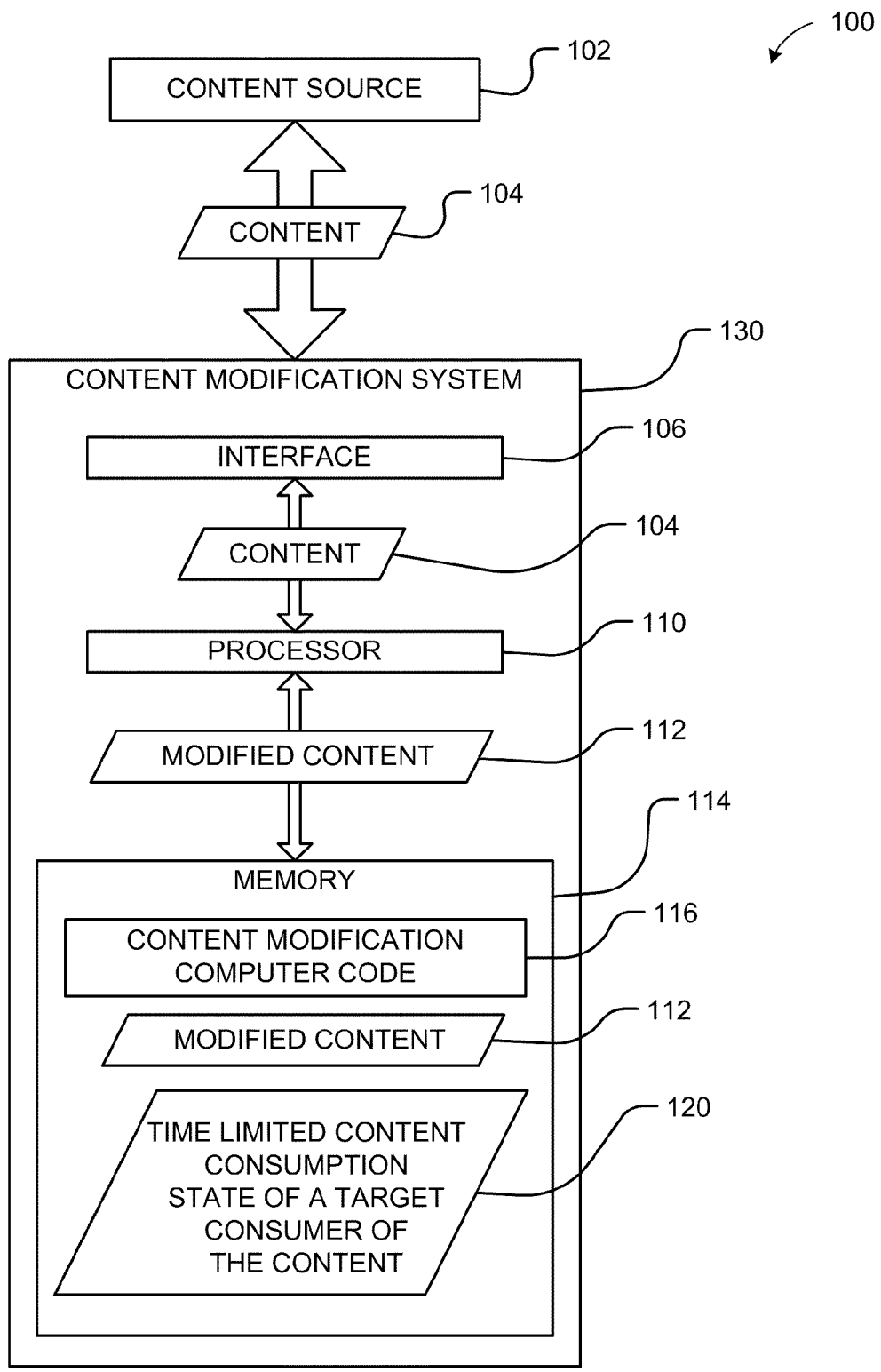
FIG. 1 is a block diagram of a first particular embodiment of a system to obtain content and generate modified content based on time limited content consumption information.

Referring to FIG. 1, a communication system 100 that includes a content modification system 130 responsive to a constant source 102 is shown. The communication system 100 also includes content 104 that is communicated from the content source 102 to the content modification system 130. The content modification system 130 includes an interface 106, a processor 110, and a memory 114. The interface 106 is configured to receive or otherwise obtain the content 104 on behalf of a target consumer. The memory 114 includes content modification computer code 116 and may store modified content 118. The memory 114 may also store a time limited content consumption state of a target consumer 120. The processor 110, which may be a computer processor or may be implemented as multiple computer processors, is programmed to modify the content 104 to generate the modified content 112. The modified content 112 is generated by the processor 110 based on the time limited content consumption state of the target consumer 120. The modified content 112, upon being generated by the processor 110, is stored within the memory 114 as illustrated in FIG. 1.

In a particular illustrative embodiment, the time limited consumption state 120 is determined based on a specified time limited content consumption time period. For example, the time limited content consumption state 120 may be classified as one of: a short duration that is less than a first threshold, a moderate duration that is longer than the first threshold but shorter than a second threshold, or a long duration that is longer than the second threshold. For example, the first threshold may be fifteen minutes and the second threshold may be two hours. In this particular example, the time limited content consumption state 120 may be classified as having a short duration if the time limited content consumption period of a target consumer is less than the first threshold (i.e. fifteen minutes). Further, the time limited content consumption state 120 may be classified as a moderate duration if the time limited content consumption period is greater than the first threshold (i.e. fifteen minutes) and less than the second threshold (i.e. two hours). Further, the time limited content consumption state 120 may be identified or otherwise classified as a long duration when the time limited content consumption period is greater than the second threshold (i.e. two hours).

The time limited content consumption period is received by or otherwise determined by the processor 110 of the content modification system 130. For example, the processor 110 may determine or estimate a time period in which a consumer of the received content 104 is likely to be available to view or otherwise consume the content 104. As an example, the content 104 may include traffic or weather information and based on either metadata within the content 104 or based on a processing rule within the processor 110, the content 104 is evaluated and an estimated time of availability for a consumer to view or use the content 104 may be determined. Alternatively, a user may provide input to the content modification system 130 that specifies a content consumption time period for the particular user. For example, a target consumer may provide user input indicating that the target consumer is available to consume content for the next ten minutes. Thus, the time limited content consumption state may be determined based on a time limited content consumption period that may be based on a specific period of time determined from user input or estimated without direct user input.

In a particular illustrative embodiment, the content modification system 130 is an element of a data communication network. For example, the content modification system 130 may be integrated within a server of an Internet Protocol Television (IPTV) system. Thus, the content modification system 130 may be a component within a network element of an IPTV system. Other data communication systems and servers may also be used for deployment of the content modification system 130. For example, the content modification system 130 may be deployed within a headend of a cable television system (CATV). Similarly, the content modification system 130 may be deployed in one or more elements of other networks, such as a satellite television network and similar broadcast networks.

Figure 2:
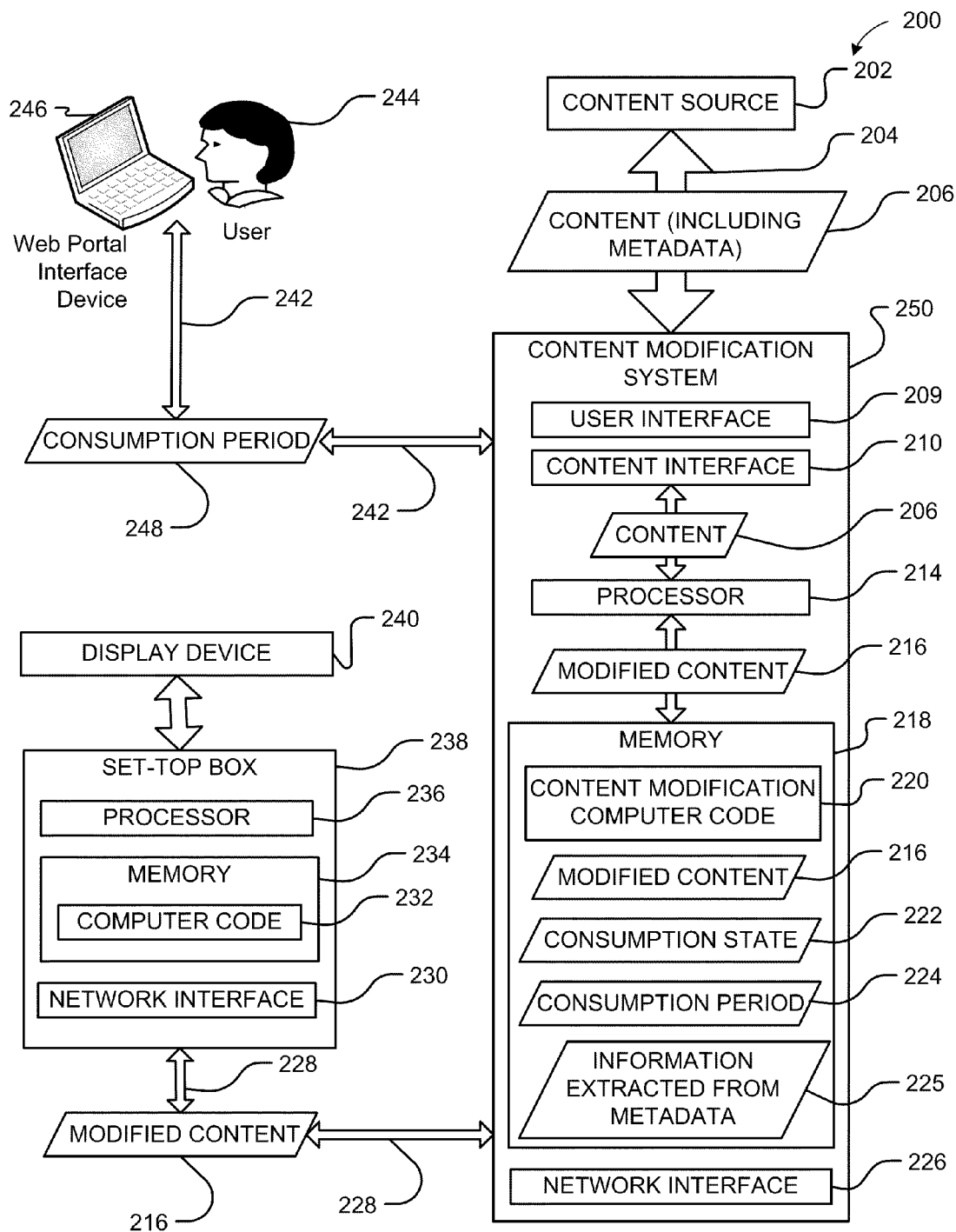
FIG. 2 is a block diagram of a second particular embodiment of a system to obtain content and generate modified content based on time limited content consumption information.

Referring to FIG. 2, a particular illustrative embodiment of a data communication system 200 is shown. The communication system 200 includes a content modification system 250 and a content source 202. The content modification system 250 has a content interface 210 to receive content 206 from the content source 202. The content modification system 250 also includes a user interface 209 to communicate with an end user, such as the illustrated user 244 of a web portal interface accessible device 246. The content modification system 250 communicates via a network to one or more media communication devices, such as the illustrated set-top box 238. The data network between the content modification system 250 and the set-top box 238 is illustrated as communication paths 228 in FIG. 2. The content modification system 250 also includes a network interface 226 for communication with the remotely located set-top box 238 via the data communication paths 228 of a distribution network.

The content modification system 250 includes a processor 214 and a memory 218. The memory 218 includes one or more processor executable programs, such as the illustrated content modification computer code 220. The memory 218 also includes data that may be usable by the processor 214, such as, a content consumption state 222, a content consumption period 224, and information extracted from metadata 225.

The set-top box 238 is coupled to a display device 240 and has a network interface 230 that is coupled to receive and transmit data with respect to the content modification system 250. The network interface 230 is coupled to the data communication paths 228. In a particular illustrated embodiment, the data communication paths 228 are part of an IPTV system. The set-top box 238 includes a processor 236 and a memory 234 that contains processor executable computer code 232.

During operation, the content modification system 250, via the user interface 209, communicates over a computer network 242 to an end user 244. For example, the user 244 of a web portal interface accessible device 246 (e.g., a personal computer or a smart phone) may communicate the content consumption period 248 with respect to the particular user 244. Thus, the user 244 via the web portal interface accessible device 246 communicates the content consumption period 248 to the content modification system 250. The content modification system 250 stores the content consumption period 248 for the particular user 244 within the memory 218. Referring to FIG. 2, the content consumption period as the stored in the memory 218 is referred to as the consumption period 224.

The content consumption period 248 may be a specified period of time, such as a time period that is input by the user 244, in which the user 244 is available to receive, view, or otherwise consume or utilize content that may be delivered by the content modification system 250 for use by the user 244. For example, the user 244 may indicate via user input that the user has a 15 minute time slot of availability to receive and review traffic or weather related information. As another example, the user 244 may have a calendar program on an electronic device, and the calendar program may automatically send the consumption period 248 for multiple time windows of potential availability of the user 244 to the content modification system 250. Alternatively, a software application that includes time or calendar type information may provide one or more availability time windows and based on a current time or a user environment, the web portal interface 246 may be used to communicate a specific content consumption time period 248 to the content modification system 250.

The processor 214 within the content modification system 250 may execute content modification computer code 220 in order to process the received content consumption time period 248 stored as the consumption period 224 within the memory 218. For example, the processor 218, upon executing the content modification computer code 220, may determine a time limited content consumption state 222 based on the consumption period 224. For example, the processor 214 may use one or more thresholds to classify the consumption period 224 into one of a plurality of designated time duration states. As a further example, the consumption state 222 may have a short duration, a long duration, an intermediate duration, or another category of time duration associated with a content consumption time of the user 244. The processor 214, upon execution of and determination of the consumption period 224, generates and stores the time limited content consumption state 222 in the memory 218.

During operation, the content modification system 250 receives content 206 via a data communication network 204 from a content source 202. For example, the content 206 may include broadcast content, such as from a broadcast network provider, or the content 206 may include data from a repository such as a website or a media storage device. Data from the content source 202 is communicated over the data network 204 to provide the content 206 to the content modification system 250. The content 206 also includes metadata associated with and characterizing the delivered content 206. The content modification system 250, upon receiving the content 206, processes the content 206 at the processor 214 to generate modified content 216 which is stored within the memory 218. As an example, the processor 214 may process the received content 206 by evaluating the content with respect to a time limited consumption state 222 or the consumption period 224 associated with the user 244. For example, if the content 206 includes a content segment that is lengthy (e.g., greater than two hours) and the content consumption state 222 indicates that the user 244 has a short content consumption state (e.g., less than fifteen minutes), the processor 214 may invoke one of a plurality of different filtering operations to reduce the time period associated with the received content segment of the received content 206. For example, the processor 214 may truncate the content or may prioritize the content 206 or a segment thereof in order to generate modified content 216 that is time reduced compared to the received content 206. As another example, the processor 214 may modify the content by reordering the content, compressing the content, prioritizing the content, altering the data format of the content, or otherwise performing and filtering or related operations with respect to the content 206 in order to generate modified content 216 that may be consumed by or on behalf of the user 244 within the designated consumption period 224 or within a time period associated with the consumption state 222, as appropriate. The modified content 216 is stored within the memory 218 for subsequent transmission to or on behalf of the user 244.

During operation, the modified content 216 may be retrieved from the memory 218 and communicated over the data communication network 228 to the set-top box 238. The network interface 230 of the set-top box 238 receives the modified content 216 and the modified content 216 is stored within memory 234. The processor 236 of the set-top box 238 may execute computer code 232 to process and render media content to a display device 240 based on the modified content 216. Thus, a user 244 may view the modified content 216 at the display device 240, and the modified content 216 is viewable or otherwise consumable by the user 244 within a time period that is preferred or has previously been specified by the user 244, as indicated by the consumption period 224 or the consumption state 222 stored within the content modification system 250.

The content modification systems 130 and 250 as shown in FIGS. 1 and 2 support a wide variety of applications and functionality on behalf of a user of electronic devices that are capable of consuming media content. For example, the disclosed system 250 may support a "start my day" interactive application that delivers personalized content to a user, for example, via a STB 238 to a display device 240 such as the user's television. The "start my day" application may deliver personalized content to the user based on predefined user preferences provided by the user which identify content that is of interest to the user. The "start my day" application may also deliver personalized content to the user based on content delivery preferences that identify the manner in which the user prefers to receive the content. Content delivery preferences may include, for example, a data format for the personalized content, a preferred device to receive the personalized content, and an order in which the content should be delivered. In addition to delivering personalized content based on preferences provided by the user, the "start my day" application may be further configured to intelligently identify content to be included in personalized content, generate alerts to transmit to the user, manage user profiles for a plurality of users, and carry out other operations to enhance the user's experience.

Referring to FIG. 2, the user 244 may utilize the web portal interface device 246 to provide information identifying content of particular interest to the user. For example, the user may indicate an interest in receiving weather information, traffic information, a daily horoscope, current news headlines, and video clips from a particular show. The user may also indicate an interest in receiving content from a particular source, such as a particular television channel, a particular website, or a particular news service. The user may further indicate an interest in receiving content from user-specific sources, such as the user's email account or a voicemail system associated with the user. In addition, the user may assign priorities to each content item of interest to the user as well as a delivery format for each item, such as audio, video, audio-video, text, image, and any other appropriate format.

The next day or at another day designated by the user 244, when the user 244 turns on their television the user could make a selection to start the "start my day" application using a remote control device. Upon initiation of the "start my day" application, weather information, traffic information, a daily horoscope, current news headlines, video clips from a particular show, and other content that the user has identified as being of interest to the user can be delivered to the television. The content can be delivered in its original format or in another format based on a user preference. For example, a user may specify that a daily horoscope is to be delivered in audio format. The "start my day" application may therefore retrieve horoscope content that is in text format and deliver the horoscope content in audio format through the use of a text to speech converter application located either at a client device of the user 244 or at a server of a service provider network. The "start my day" application may present all content of interest to the user in the order in which the content was received, in a predetermined order specified by the user, or according to priorities assigned by the user.

In addition to delivering content to the user based on information provided by the user that identifies content of particular interest to the user, the "start my day" application may also personalize content based on additional information relating to the current state of the user. Information relating to the current state of the user can include, for example, the current location of the user, the amount of time a user is available to receive content, and the devices available to the user for receiving content, such as a television, a mobile device, or a personal computer. Information relating to the current state of the user can be used in conjunction with user preferences to personalize content that is delivered to the user. For example, the current location of the user may be used to deliver relevant weather information for a user that is away from their hometown on a business trip when the user has indicated an interest in receiving weather information. The location of a user may be learned by the "start my day" application in a variety of ways, including through direct input from the user, by examining information stored in a user's calendar, or through the use of Global Positioning System (GPS) data acquired by a GPS receiver at a user's device.

The "start my day" application may further be configured to generate alerts for delivery to the user. Alerts may be generated, for example, based on scheduled reminders in the user's calendar, based on weather information indicating that inclement weather is near the user, based on traffic information indicating that a road is closed or that an accident has occurred near the user, or based on information indicating that the user should no longer be viewing the content. The "start my day" application may determine that the user should no longer be viewing the content in a variety of ways, including based on the current time and the user's schedule. For example, if the "start my day" application determines that the current time is 8:30 A.M., the user has a 30 minute commute to work, and the user has a work meeting at 9 A.M., the "start my day" application can generate an alert warning the user that the user needs to leave home immediately in order to arrive at work in time for the user's work meeting. The alert may include an audible warning selected from a library of alert sounds.

As another example, an application of a personal video carousel may be deployed. In the carousel application, the user 244 may receive a daily update of particular content matching their designated criteria. An example of the particular criteria includes, but is not limited to, content type, content length, or other particular information such as a particular designated program. Based on the criteria, a service supported by the content modification system 250 may fetch the desired information from various data sources, such as via content source 202, and may present a bundled or otherwise packaged display of information determined to be relevant with respect to the criteria. As an example, the system may chose to retrieve snippets from video files without retrieving an entire video file. The content retrieval process may take place in the background so that results can be played back to the user at a specific time or on demand as requested. The background retrieval operations can either identify a pointer to particular media or render media files for display at a display device 240. The pointer or file options are supported by a play back device, such as the set-top box 238. Alternatively, or in addition, the background content retrieval routine may optionally store requested information at a media storage device, such as at a digital video recorder (DVR) or other electronic device (e.g., a mobile phone).

Referring to FIG. 2, although only a single user 244 is depicted for purposes of illustration, the content modification system 250 can support multiple users that receive modified content at multiple devices. For example, a plurality of users may create user profiles via one or more web portal interfaces, such as the illustrated web portal interface 246. Each user profile may include information that identifies types of content and sources of content that are of particular interest to the user. Each user profile may be stored in memory 218 at the content modification system 250 and utilized by the content modification system 250 to deliver personalized modified content 216 that is customized for each of a plurality of users.

Supporting a multiuser environment could be carried out by prompting a user to provide the user's identity before content is accessed, modified, and delivered to the user. For example, a prompt may be delivered to the user via the set-top box 238 for display at the display device 240. The user may subsequently choose from a displayed list of available user profiles. Upon receipt of the user's identity, the content modification system 250 can proceed with accessing content 206 and producing modified content 216 for delivery to the identified user in accordance with information contained in the user profile associated with the identified user. Alternate methods to identify the user may be used, such as by use of the set-top box 238 or based on information stored at a communication services provider.

In a particular illustrative embodiment, the content modification system 250 is an element of a data communication network. For example, the content modification system 250 may be integrated within a server of an IPTV system. Thus, the content modification system 250 may be a component within a network element of an IPTV system. Other data communication systems and servers may also be used for deployment of the content modification system 250. For example, the content modification system 250 may be deployed within a headend of a CATV system. Similarly, the content modification system 250 may be deployed in one or more elements of other networks, such as a satellite television network and similar broadcast networks.

Figure 3:
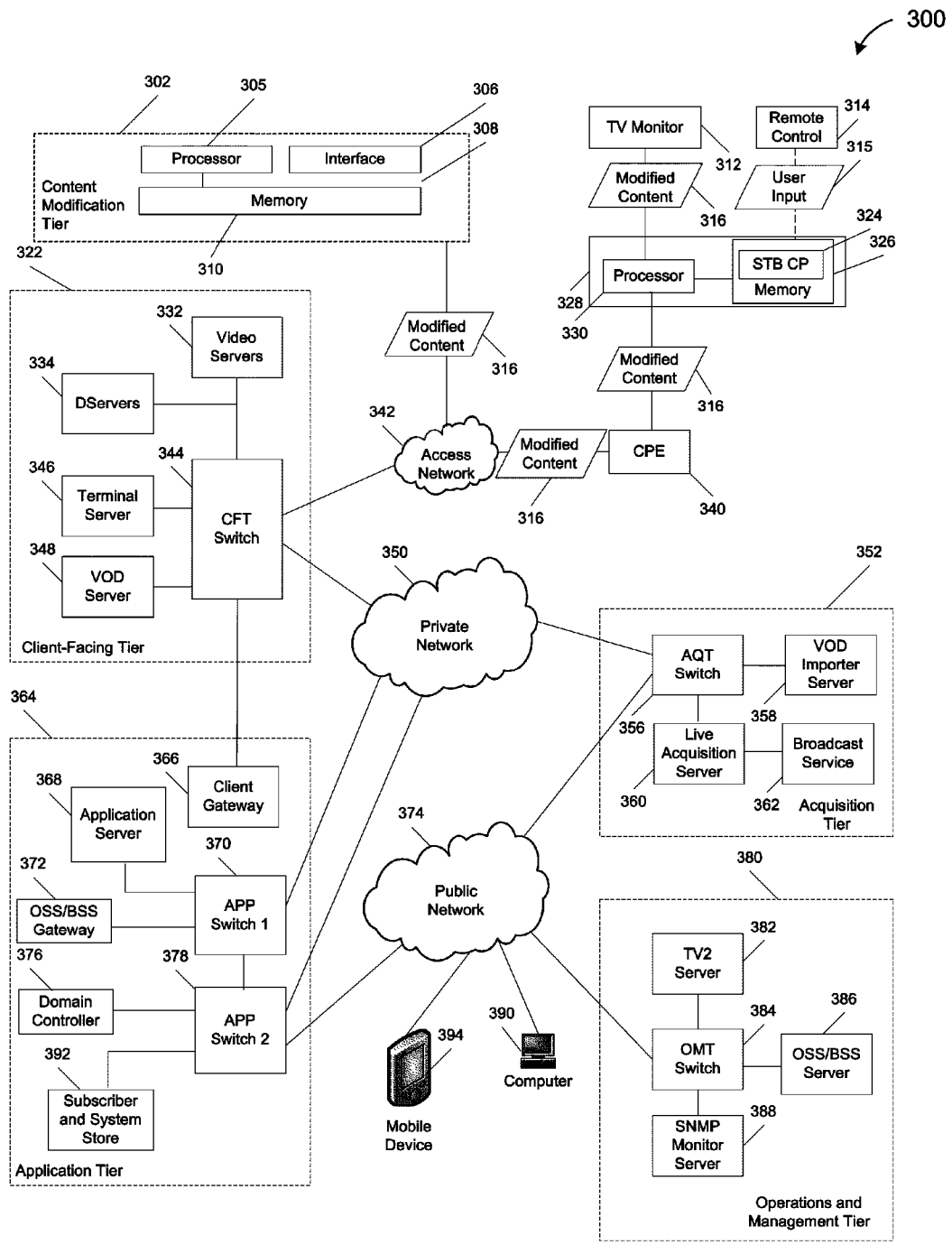
FIG. 3 is a block diagram of a third particular embodiment of a system to obtain content and generate modified content based on time limited content consumption information.

Referring to FIG. 3, an embodiment of a system to obtain content and generate modified content based on time limited content consumption information is illustrated and generally designated 300. In the embodiment of FIG. 3, obtaining content and generating modified content based on time limited content consumption information is carried out using an Internet Protocol Television (IPTV) system. The embodiment of FIG. 3 is included only for illustrative purposes. Readers will understand that the television system can be a cable television system, a satellite television system, or any other television system. Further, the embodiment of FIG. 3 describes only one possible implementation of an IPTV television service. Readers will also understand that an IPTV television service can be embodied in many other ways and that each alternative embodiment is within the scope of the present invention.

As shown, the system 300 can include a content modification tier 302, a client facing tier 322, an application tier 364, an acquisition tier 352, and an operations and management tier 380. Each tier 302, 322, 352, 364, and 380 can be coupled to a private network 350; to a public network 374, such as the Internet; to an access network 342; or to more than one of the private network 350, the public network 374, and the access network 342. For example, the client-facing tier 322 can be coupled to the private network 350 and the access network 342. The content modification tier 302 can be coupled to the access network 342. Further, the application tier 364 can be coupled to the private network 350 and to the public network 374. The acquisition tier 352 can also be coupled to the private network 350 and to the public network 374. Additionally, the operations and management tier 380 can be coupled to the public network 374.

As illustrated in FIG. 3, the various tiers 302, 322, 352, 364, and 380 may communicate with each other via the private network 350, the public network 374, and the access network 342. For instance, the client-facing tier 322 can communicate with the application tier 364 and the acquisition tier 352 via the private network 350. The content modification tier 302 can communicate with the client facing tier 322 via the access network 342. The application tier 364 can communicate with the acquisition tier 352 via the private network 350. Further, the application tier 364 can communicate with the acquisition tier 352 and the operations and management tier 380 via the public network 374. Moreover, the acquisition tier 352 can communicate with the operations and management tier 380 via the public network 374. In a particular embodiment, elements of the application tier 364, including but not limited to a client gateway 366, can communicate directly with the client-facing tier 322.

The client-facing tier 322 may communicate with user equipment via the access network 342, such as an IPTV access network. In an illustrative embodiment, customer premises equipment (CPE) 340 can be coupled to a local switch, router, or other device of the access network 342. The client-facing tier 322 can communicate with a representative set-top box device 328 at a customer premise via the CPE 340. The CPE 340 can include routers, local area network devices, modems, such as digital subscriber line (DSL) modems, any other suitable devices for facilitating communication between a set-top box device and the access network 342, or any combination thereof.

In a particular embodiment, the client-facing tier 322 can be coupled to the CPE 340 via fiber optic cables. Alternatively, the CPE 340 can include DSL modems that are coupled to one or more network nodes via twisted pairs, and the client-facing tier 322 can be coupled to the network nodes via fiber-optic cables. The set-top box device 328 can process data received via the access network 342, via an IPTV software platform.

The set-top box device 328 can be coupled to an external display device, such as a television monitor 312. Moreover, the set-top box device 328 can communicate with a remote control 314 to receive user input 315. The set-top box device 328 can include IPTV set-top box devices as well as video gaming devices or consoles that are adapted to receive IPTV content. The set-top box device 328 can also include personal computers or other computing devices that are adapted to emulate set-top box device functionalities and any other device adapted to receive IPTV content and transmit data to an IPTV system via an access network.

In an exemplary, non-limiting embodiment, the set-top box device 328 can receive data, video, or any combination thereof, from the client-facing tier 322 via the access network 342 and render or display the data, video, or any combination thereof, at the display device 312 to which it is coupled. In an illustrative embodiment, the set-top box device 328 can include tuners that receive and decode television programming signals or packet streams for transmission of content to the display device 312. Further, the set-top box device 328 can include a STB processor 330 and a STB memory device 326 that is accessible to the STB processor 330. In one embodiment, a computer program, such as the STB computer program 324, can be embedded within the STB memory device 326. In another illustrative embodiment, a user computing device, such as a personal computer, laptop or local server, can be coupled to the set-top box device 328, for example, via a universal serial bus (USB) connection or other connection.

The set-top box device 328 may also be coupled to the client-facing tier 322 via access network 342. The set-top box device 328 may receive modified content 316 from the content modification tier 302 via the access network 342. The modified content 316 is generated by modifying content that may be acquired via the acquisition tier 352, the private network 350, the public network 374, or from the STB memory device 326. Content may be acquired at the content modification tier 302 via the interface 306. The content may be subsequently modified based on time limited content consumption information. Modification of the content may be carried out by a processor 305 and the modified content 316 may be stored in the memory 310 at the content modification tier 302.

In an illustrative embodiment, the client-facing tier 322 can include a client-facing tier (CFT) switch 344 that manages communication between the client-facing tier 322 and the access network 342 and between the client-facing tier 322 and the private network 350. As illustrated, the CFT switch 344 is coupled to one or more data servers, such as D-servers 334, that store, format, encode, replicate, or otherwise manipulate or prepare video content for communication from the client-facing tier 322 to the set-top box device 328. The CFT switch 344 can also be coupled to a terminal server 346 that provides terminal devices with a connection point to the private network 350. In a particular embodiment, the CFT switch 344 can be coupled to a video-on-demand (VOD) server 348 that stores or provides VOD content imported by the IPTV system 300.

Further, the CFT switch 344 is coupled to one or more video servers 332 that receive video content and transmit the content to the set-top box device 328 via the access network 342. In a particular embodiment, the CFT switch 344 can be coupled to one or more publication servers that facilitate the formation of groups that share private content and the inclusion of indicators of such private content with video content received by users in a group.

In an illustrative embodiment, the client-facing tier 322 can communicate with a large number of set-top boxes, such as the representative set-top box 328 over a wide geographic area, such as a regional area, a metropolitan area, a viewing area, a designated market area or any other suitable geographic area, market area, or subscriber or customer group that can be supported by networking the client-facing tier 322 to numerous set-top box devices. In a particular embodiment, the CFT switch 344, or any portion thereof, can include a multicast router or switch that feeds one or more video streams from a video server to multiple set-top box devices.

As illustrated in FIG. 3, the application tier 364 can communicate with both the private network 350 and the public network 374. The application tier 364 can include a first application tier (APP) switch 370 and a second APP switch 378. In a particular embodiment, the first APP switch 370 can be coupled to the second APP switch 378. The first APP switch 370 can be coupled to an application server 368 and to an OSS/BSS gateway 372. In a particular embodiment, the application server 368 can provide applications to the set-top box device 328 via the access network 342, which enable the set-top box device 328 to provide functions, such as display, messaging, processing of IPTV data and VOD material, etc. In a particular embodiment, the OSS/BSS gateway 372 includes operation systems and support (OSS) data, as well as billing systems and support (BSS) data. In one embodiment, the OSS/BSS gateway 372 can provide or restrict access to an OSS/BSS server 386 that stores operations and billing systems data.

The second APP switch 378 can be coupled to a domain controller 376 that provides Internet access, for example, to users at their computer 390 or mobile device 394 via the public network 374. For example, the domain controller 376 can provide remote Internet access to IPTV account information, e-mail, personalized Internet services, or other online services via the public network 374. In addition, the second APP switch 378 can be coupled to a subscriber and system store 392 that includes account information, such as account information that is associated with users who access the IPTV system 300 via the private network 350 or the public network 374. In an illustrative embodiment, the subscriber and system store 392 can store subscriber or customer data and create subscriber or customer profiles that are associated with IP addresses of corresponding set-top box device 328.

In a particular embodiment, the application tier 364 can include a client gateway 366 that communicates data directly to the client-facing tier 322. The client gateway 366 may be coupled directly to the CFT switch 344. The client gateway 366 can provide user access to the private network 350 and the tiers coupled thereto. In an illustrative embodiment, the set-top box device 328 can access the IPTV system 300 via the access network 342, using information received from the client gateway 366. User devices can access the client gateway 366 via the access network 342, and the client gateway 366 can allow such devices to access the private network 350 once the devices are authenticated or verified. Similarly, the client gateway 366 can prevent unauthorized devices, such as hacker computers or stolen set-top box devices from accessing the private network 350, by denying access to these devices beyond the access network 342.

For example, when the representative set-top box device 328 accesses the client-facing tier 322 via the access network 342, the client gateway 366 can verify subscriber information by communicating with the subscriber and system store 392 via the private network 350. Further, the client gateway 366 can verify billing information and status by communicating with the OSS/BSS gateway 372 via the private network 350. In one embodiment, the OSS/BSS gateway 372 can transmit a query via the public network 374 to the OSS/BSS server 386. After the client gateway 366 confirms subscriber and/or billing information, the client gateway 366 can allow the set-top box device 328 to access IPTV content and VOD content at the client-facing tier 322. If the client gateway 366 cannot verify subscriber information for the set-top box device 328, e.g., because it is connected to an unauthorized twisted pair, the client gateway 366 can block transmissions to and from the set-top box device 328 beyond the access network 342.

As indicated in FIG. 3, the acquisition tier 352 can include an acquisition tier (AQT) switch 356 that communicates with the private network 350. The AQT switch 356 can also communicate with the operations and management tier 380 via the public network 374. In a particular embodiment, the AQT switch 356 can be coupled to a live acquisition server 360 that receives or acquires television content, movie content, advertisement content, other video content, or any combination thereof, from a broadcast service 362, such as a satellite acquisition system or satellite head-end office. In a particular embodiment, the live acquisition server 352 can transmit content to the AQT switch 356, and the AQT switch 356 can transmit the content to the CFT switch 344 via the private network 350.

In an illustrative embodiment, content can be transmitted to the D-servers 334, where it can be encoded, formatted, stored, replicated, or otherwise manipulated and prepared for communication from the video server(s) 332 to the set-top box device 328. The CFT switch 344 can receive content from the video server(s) 332 and communicate the content to the CPE 340 via the access network 342. The set-top box device 328 can receive the content via the CPE 340, and can transmit the content to the television monitor 312. In an illustrative embodiment, video or audio portions of the content can be streamed to the set-top box device 328.

Further, the AQT switch 356 can be coupled to a video-on-demand importer server 358 that receives and stores television or movie content received at the acquisition tier 352 and communicates the stored content to the VOD server 346 at the client-facing tier 322 via the private network 350. Additionally, at the acquisition tier 352, the video-on-demand (VOD) importer server 358 can receive content from one or more VOD sources outside the IPTV system 300, such as movie studios and programmers of non-live content. The VOD importer server 358 can transmit the VOD content to the AQT switch 356, and the AQT switch 356, in turn, can communicate the material to the CFT switch 344 via the private network 350. The VOD content can be stored at one or more servers, such as the VOD server 348.

When users issue requests for VOD content via the set-top box device 328, the requests can be transmitted over the access network 342 to the VOD server 348, via the CFT switch 344. Upon receiving such requests, the VOD server 348 can retrieve the requested VOD content and transmit the content to the set-top box device 328 across the access network 342, via the CFT switch 344. The set-top box device 328 can transmit the VOD content to the television monitor 312. In an illustrative embodiment, video or audio portions of VOD content can be streamed to the set-top box device 328.

FIG. 3 further illustrates that the operations and management tier 380 can include an operations and management tier (OMT) switch 384 that conducts communication between the operations and management tier 380 and the public network 374. In the embodiment illustrated by FIG. 3, the OMT switch 384 is coupled to a TV2 server 382. Additionally, the OMT switch 384 can be coupled to an OSS/BSS server 386 and to a simple network management protocol (SNMP) monitor 388 that monitors network devices within or coupled to the IPTV system 300. In a particular embodiment, the OMT switch 384 can communicate with the AQT switch 356 via the public network 374.

In an illustrative embodiment, the live acquisition server 330 can transmit content to the AQT switch 356, and the AQT switch 356, in turn, can transmit the content to the OMT switch 384 via the public network 374. In this embodiment, the OMT switch 384 can transmit the content to the TV2 server 382 for display to users accessing the user interface at the TV2 server 382. For example, a user can access the TV2 server 382 using a personal computer (PC) 390 coupled to the public network 374.

It will be appreciated that the system 300 of FIG. 3 can take advantage of the benefits provided by an IPTV television service relative to other television services. For example, the IP-based platform may provide the ability to integrate television services with other IP-based services such as high speed Internet access and VoIP telephone services. Furthermore, an IPTV television service may be less susceptible to loss of service issues that can arise during inclement weather relative to other television services such as a satellite television service or television services that utilize traditional broadcast television signals. As explained herein, the embodiment of FIG. 3 is included for illustrative purposes and in no way is intended to limit the scope of the present application.

Figure 4:
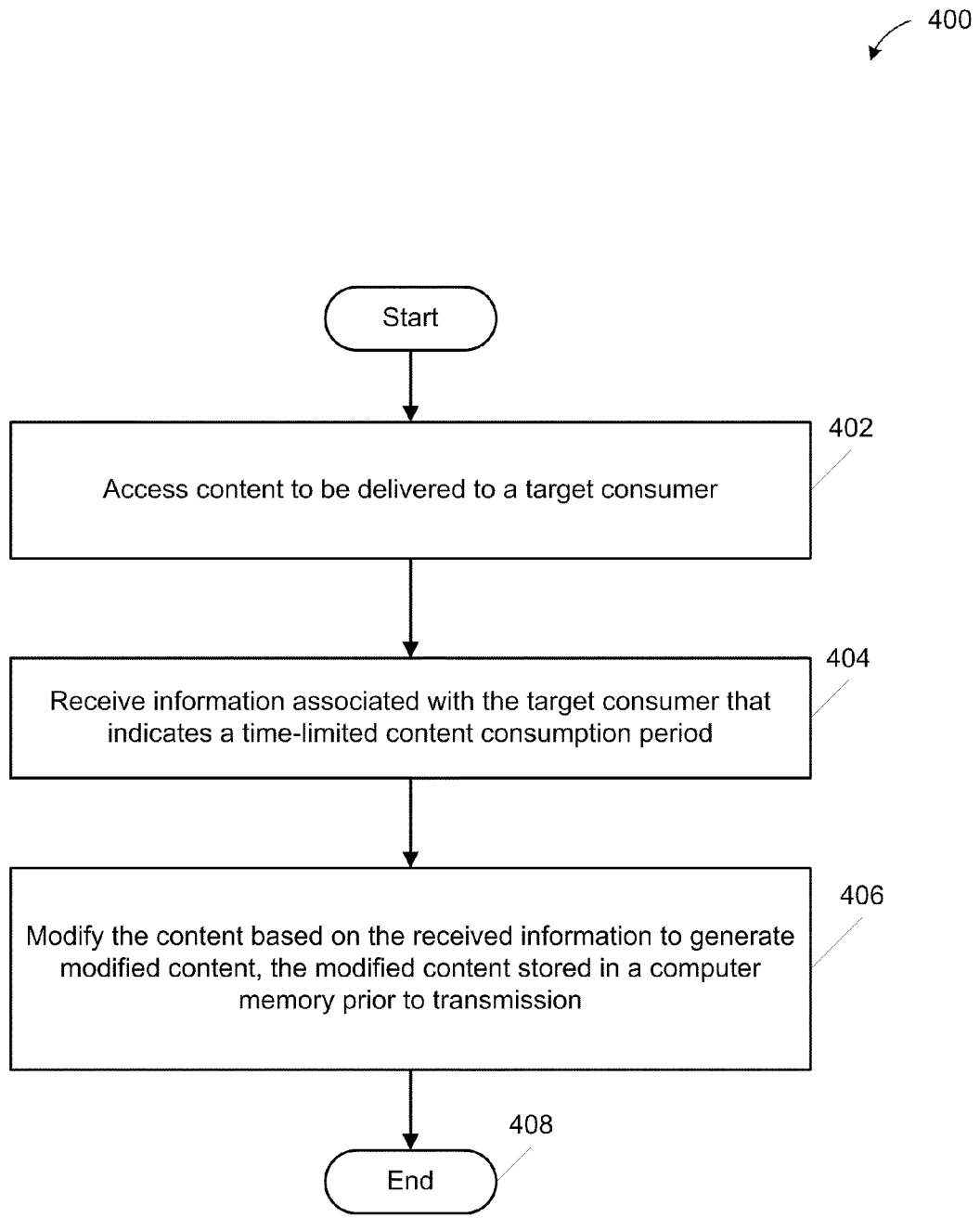
FIG. 4 is a flow diagram of a first particular embodiment of a method to obtain content and generate modified content based on a time limited content consumption information.

Referring to FIG. 4, a particular embodiment of a method to obtain content and generate modified content based on a time limited content consumption information is illustrated. The method includes accessing content to be delivered to a target consumer, at 402. For example, referring to FIG. 2, the content 206 may be accessed by the content modification system 250 for delivery to a target consumer, such as the user 244. The method further includes receiving information associated with the target consumer that indicates time based information, such as, a time limited content consumption period, as shown at 404. For example, referring to FIG. 2, the content modification system 250 may receive information 225 that is extracted or otherwise derived from metadata with the content 206 that indicates a time limited content consumption period. Alternatively, the content modification system 250 may receive information related to the time limited content consumption period 248 directly via an end user interface device 246 of the user 244. Thus, the method may receive time limited content consumption period information either directly from the user or indirectly by evaluating content or metadata associated with the content received from a content source.

The method further includes modifying the received content based on the received information to generate modified content, as shown at 406. For example, referring to FIG. 2, the content modification system 250 may modify the content 206 based on the time limited consumption period 224 or the consumption state 222 and may filter the content 206 to generate modified content that may be played back within a desired time period. The modified content is stored in a computer memory prior to transmission, as shown at 406. For example, referring to FIG. 2, the processor 214 may modify the content 206 using one or more filters or similar operations to generate modified content 216. The modified content 216 may be stored in the computer memory 216 prior to being broadcast to the set-top box 238. The method terminates, at 408.

In a particular embodiment, the information associated with the target consumer may include weather information, traffic information, flight information, a creation time of acquired content, or other information correlated to or having a dependency upon time. Alternatively, or in addition, the received information may be extracted from metadata of received content or may be received via user input. In a particular illustrated embodiment, the method may receive information that indicates or provides a basis to support a time limited content consumption period of a particular targeted user. The time limited content consumption period may be determined or calculated based on a current time, information retrieved from a calendar application of an electronic device of a user, or an amount of time required to perform one or more tasks that impact the user's availability to view, use, or otherwise consume modified content. For example, if the current time is 8:00 AM, and the calendar information indicates a meeting at 8:30 AM, and an application indicates a necessary preparation time of 15 minutes prior to the 8:30 AM meeting, the content may be modified based on a time limited content consumption period of no greater than 15 minutes. In this example, sourced content may be modified, such as prioritized or truncated as necessary to have a size reduced or time reduced length so that the content may be viewed or consumed within the designated time interval of 15 minutes. In addition, the playback speed for the modified content may be increased or decreased and portions of the modified content may be skipped. Thus, the playback period of the resulting modified content may be less than the time limited content consumption period and may be less than the original received content playback time.

Figure 5:
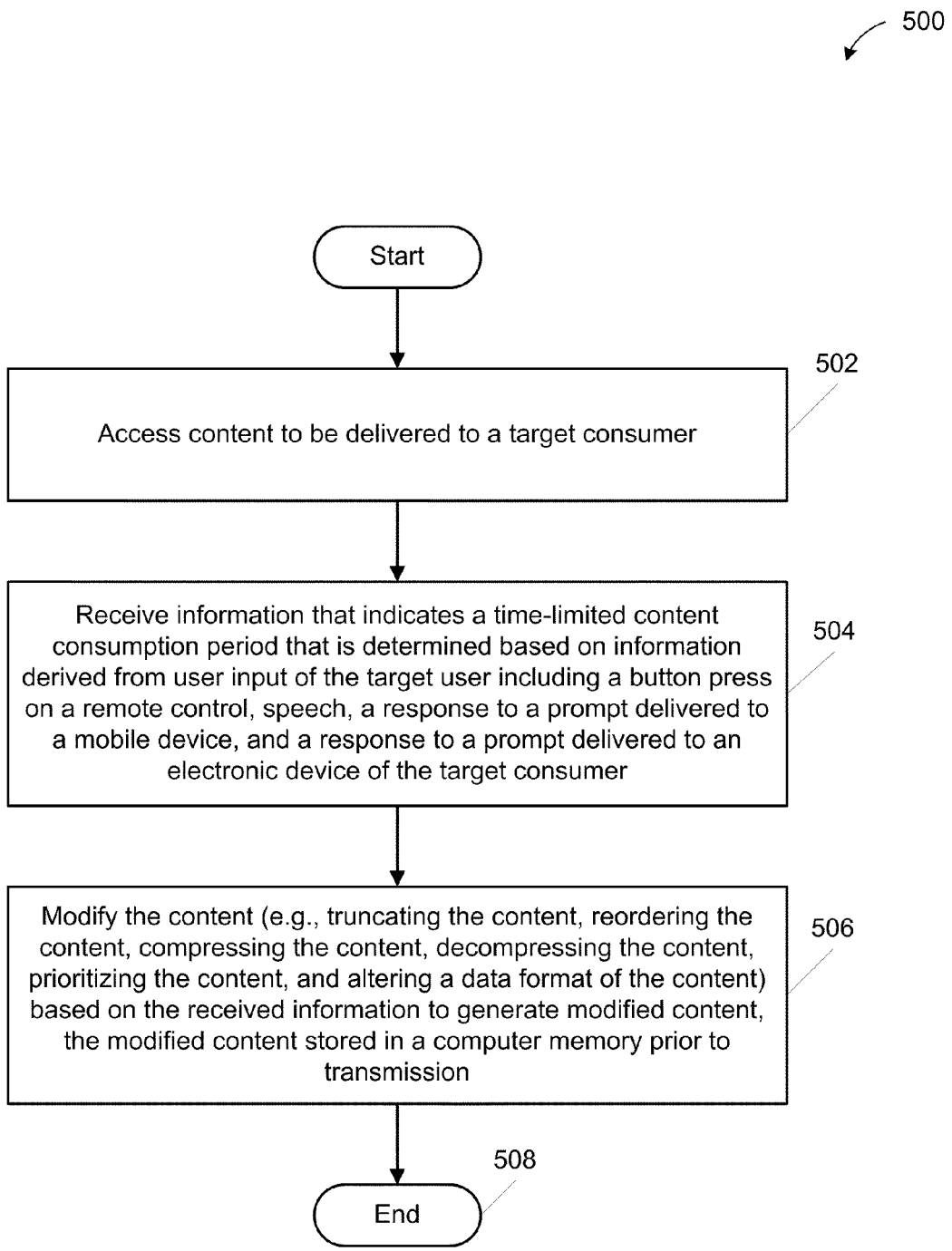
FIG. 5 is a flow diagram of a second particular embodiment of a method to obtain content and generate modified content based on time limited content consumption information.

Referring to FIG. 5, another particular embodiment of a method to obtain content and generate modified content based on time limited content consumption information is illustrated. The method includes accessing content to be delivered to a target consumer, as shown at 502. For example, referring to FIG. 2, content 206 from the content source 202 may be accessed by the content modification system 250 for subsequent delivery to the target consumer.

The method also includes receiving information that indicates a time limited content consumption period that is determined based on information derived from user input from the target consumer, as shown at 504. User input of the target may be provided by a button press on a remote control, speech from the user, a response to a prompt delivered to an electronic device associated with the targeted, and a response to a prompt delivered to the electronic device of the target consumer. For example, referring to FIG. 2, user input may be provided by a button press on a remote control (not shown) for the set-top box 238. Furthermore, referring to FIG. 3, user input may be provided by speech received at a mobile device 394, or in response to a prompt delivered to the mobile device 394 or a personal computer 390 accessible by a user.

The method further includes modifying the content based on received information to generate modified content, as shown at 506. The modified content is stored in a computer memory prior to transmission. For example, referring to FIG. 2, the modified content 216 is stored in the memory 218 of the content modification system 250. Modifying the content may include, for example, truncating the content, reordering the content, compressing the content, prioritizing the content, and altering a data format of the content. Truncating the content may be carried out by transmitting only a portion of the original content to the user. The method terminates 508.

Figure 6:
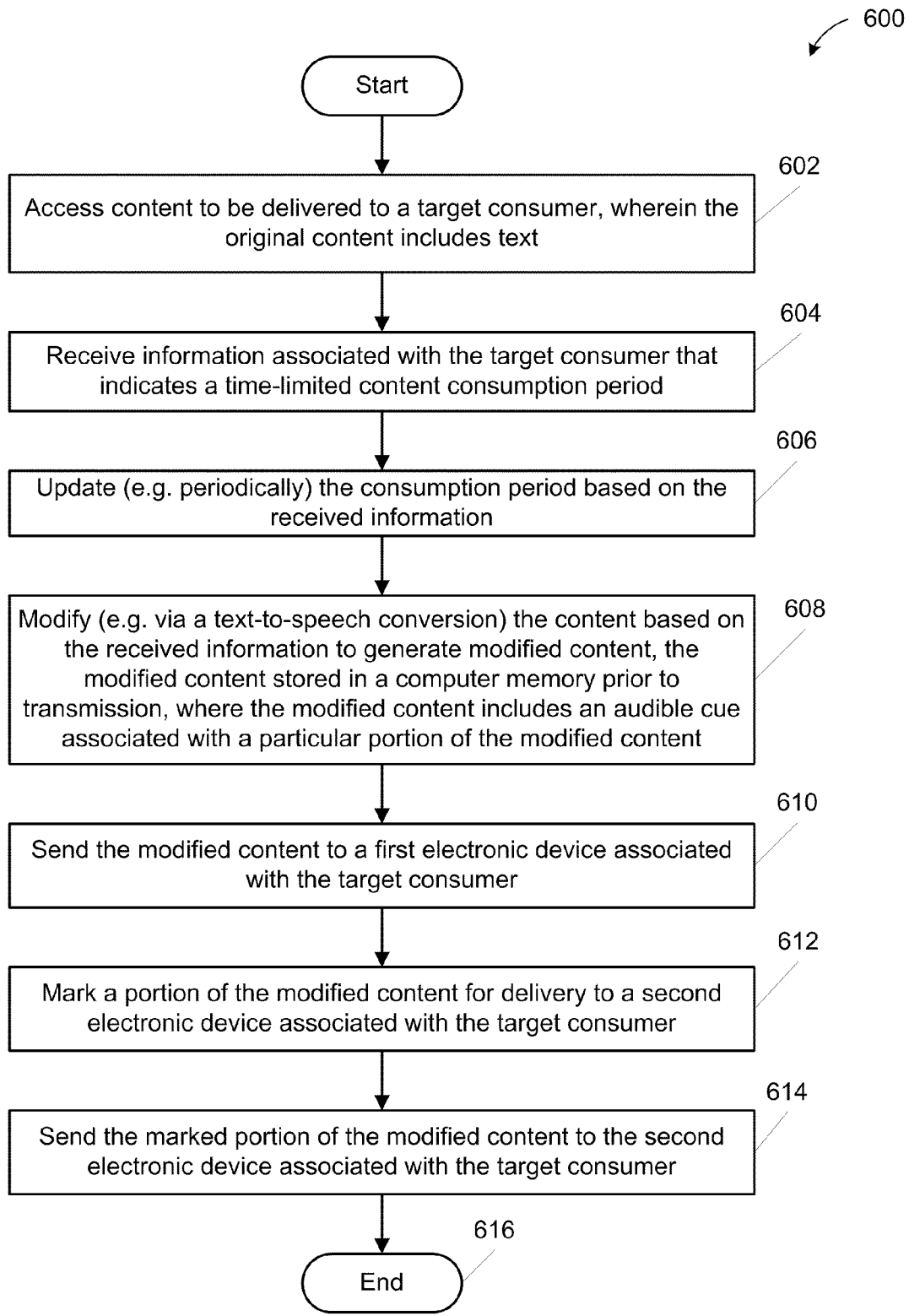
FIG. 6 is a flow diagram of a third particular embodiment of a method to obtain content and generate modified content based on time limited content consumption information.

Referring to FIG. 6, a method to obtain content and generate modified content based on time limited content consumption information is illustrated. The method includes accessing content to be delivered to a target consumer where the accessed content includes text, at 602. For example, referring to FIG. 2, content 206 may be accessed by the content modification system 250 and such content 206 may include text as part of the content 206.

The method includes receiving information associated with a target consumer that indicates a time limited consumption content period, as shown at 604. For example, referring to FIG. 2, information associated with a target consumer that indicates the time limited content consumption period 248 may be received from the user 244 at the content modification system 250.

The method further includes updating the consumption period based on received information, as shown at 606. The content consumption period may be updated periodically or at specified periods of time. Updating the consumption period may be carried out, for example, by receiving user input indicating a new consumption period or by inferring a change in the consumption period from the content itself.

The method further includes modifying the content based on the received information to generate modified content, as shown at 608. The modified content may be stored in a computer memory prior to transmission to the target user. The modified content may also include audible cues associated with a particular portion of the modified content. For example, when a portion of the modified content that includes traffic information is about to be delivered to the target consumer, an audio clip of a car horn honking may be inserted as an audible cue. As a further example, when a portion of the modified content that includes weather information is about to be delivered to the target consumer, an audio clip of a thunderstorm may be inserted as an audible cue. In addition to including audible cues in the modified content, the modified content may also include audio overlays. The modified content may therefore include audio content that is independent of video content that is delivered to a target consumer.

Modifying the content may also include a text to speech conversion operation. Text to speech conversion may be carried out, for example, by receiving a Really Simple Syndication (RSS) data feed from a source provider and converting text contained in the feed to speech. The speech may be subsequently delivered to the target user as an audio file. For example, referring to FIG. 2, an audio file representing speech from a text to speech converter may be played back at a speaker of the display device 240 via the set-top box 238.

The method further includes sending the modified content to a first electronic device associated with the target consumer, as shown at 610. For example, referring to FIG. 2, the modified content 216 is sent to the set-top box 238 and delivered to the display device 240. The display device 240 may be a television and may be the first electronic device associated with the target consumer.

The method further includes marking a portion of the modified content for delivery to a second electronic device associated with the target consumer, as shown at 612. For example, referring to FIG. 3, the mobile device 394, such as a smart phone or a cellular phone, or computer 390 may be the second electronic device associated with the target consumer. Marking a portion of the content for delivery to the second computer may be carried out in response to user input received via any of the other electronic devices associated with the target consumer.

The method also includes sending a marked portion of the modified content to the second electronic device associated with the target consumer, as shown at 614. For example, referring to FIG. 3, marked portions of the content may be delivered to the mobile device 392 associated with the user. A user who is unable to view a particular media stream using an electronic device may have a selected portion (e.g. the unviewed portion) of the media stream delivered to a second electronic device, such as to a mobile device. The method terminates at 616.

Figure 7:
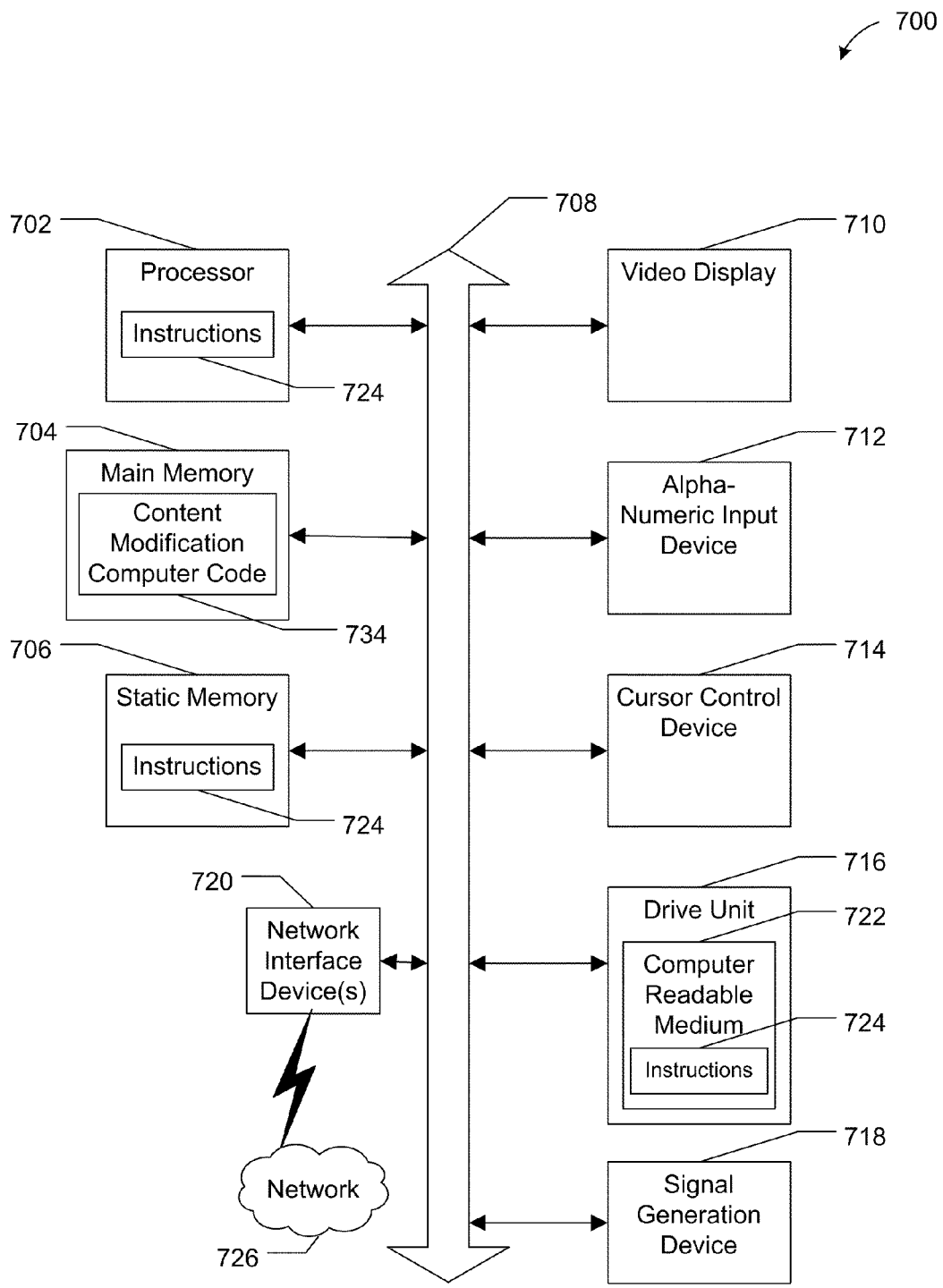
FIG. 7 is a block diagram of an illustrative embodiment of a general computer system.

Referring to FIG. 7, an illustrative embodiment of a general computer system is shown and is designated 700. The computer system 700 may include content modification computer code 734 that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within the content modification systems 130, 250 as described with reference to FIGS. 1-2. The computer system 700 may also include or be included within the content modification tier as described with reference to FIG. 3.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 may include a main memory 704 and a static memory 706, which can communicate with each other via a bus 708. As shown, the computer system 700 may further include a video display unit 710, such as a liquid crystal display (LCD), a projection television system, a flat panel display, or a solid state display. Additionally, the computer system 700 may include an input device 712, such as a keyboard, and a cursor control device 714, such as a mouse. The computer system 700 may also include a disk drive unit 716, a signal generation device 718, such as a speaker or remote control, and one or more network interface devices 720 capable of communicating with network 726. Some computer systems 700 may not include an input device (e.g., a server may not include an input device).

In a particular embodiment, as depicted in FIG. 7, the disk drive unit 716 may include a computer-readable storage medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 724, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a computer-readable storage medium that stores content modification computer code 734. While the computer-readable storage medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium may include a solid-state memory such as a memory card or other package that houses one or more non-volatile read-only memories. Further, the computer-readable storage medium may be a random access memory or other volatile re-writable memory. Additionally, the computer-readable storage medium may include a magneto-optical or optical medium, such as a disk or tapes or other storage device. A digital file attachment to an e-mail or other self-contained information archive or set of archives may be considered equivalent to a tangible storage medium. Accordingly, the disclosure is considered to include any one or more of a computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   an interface to obtain content on behalf of a target consumer;
   a memory; and
   a processor to perform operations including:
   modifying the content to generate modified content, the modified content based on time limited content consumption information associated with the target consumer, wherein the modified content is stored in the memory;
   initiating transmission of the modified content to a first electronic device associated with the target consumer;
   in response to user input, marking a portion of the modified content for delivery to a second electronic device associated with the target consumer to generate a marked portion, wherein the marked portion corresponds to a first portion of the modified content that was not displayed at the first electronic device, and wherein the user input indicates that the target consumer has not viewed the portion of the modified content; and
   initiating transmission of the marked portion of the second device, wherein the marked portion is distinct from a second portion of the modified content that was displayed at the first electronic device, and wherein the marked portion is not delivered to the first electronic device.

2. The system of claim 1, wherein the time limited content consumption state is classified as a short duration when the time limited content consumption period is less than a first threshold, wherein the time limited content consumption state is classified as a moderate duration when the time limited content consumption period is greater than the first threshold but less than a second threshold, and wherein the time limited content consumption state is classified as a long duration when the time limited content consumption period is greater than the second threshold.

3. The system of claim 1, wherein the time limited content consumption period is a specific amount of time.

4. The system of claim 3, wherein the specific amount of time is based only on user input.

5. The system of claim 3, wherein the specific amount of time is estimated without direct user input.

6. The system of claim 1, wherein the memory and the interface are located at a network element of an Internet Protocol Television system.

7. The system of claim 6, further comprising a second interface to send the modified content from the network element to a set-top box associated with the target consumer.

8. A method comprising:
   receiving information associated with a target consumer, the information indicating a time limited content consumption period;
   modifying content based on the information to generate modified content, the modified content stored in a computer memory;
   initiating transmission of the modified content to a first electronic device associated with the target consumer;
   in response to user input, marking a portion of the modified content for delivery to a second electronic device associated with the target consumer to generate a marked portion, wherein the marked portion corresponds to a first portion of the modified content that was not displayed at the first electronic device, and wherein the user input indicates that the target consumer has not viewed the portion of the modified content; and
   initiating transmission of the marked portion of the second device, wherein the marked portion is distinct from a second portion of the modified content that was displayed at the first electronic device, and wherein the marked portion is not delivered to the first electronic device.

9. The method of claim 8, wherein the time limited content consumption period is determined at least partially based on information extracted from at least a portion of the content, metadata of the content, or any combination thereof, and wherein a playback period of the modified content is less than the time limited content consumption period.

10. The method of claim 8, wherein modifying the content comprises: reordering the content, compressing the content, decompressing the content, prioritizing the content, altering a data format of the content or a combination thereof.

11. The method of claim 9, wherein the information includes weather information, traffic information, flight information, a creation time of the content, or a combination thereof.

12. The method of claim 8, wherein the time limited content consumption period is determined based on: a current time, information retrieved from a calendar, an amount of time required to perform a task that impacts an availability of the target consumer to view the modified content, or a combination thereof.

13. The method of claim 8, wherein the time limited content consumption period is determined based on information from a second user input of the target consumer including a button press on a remote control, speech, a response to a prompt delivered to a mobile device, a response to a prompt delivered to an electronic device of the target consumer, or a combination thereof.

14. The method of claim 8, wherein the content includes text and wherein modifying the content includes performing a text-to-speech conversion of the text.

15. The method of claim 8, wherein the time limited content consumption period is periodically updated.

16. A computer-readable storage device comprising operational instructions that, when executed by a processor, cause the processor to perform operations including:
   obtaining content on behalf of a target consumer;
   modifying the content based on time limited content consumption information associated with the target consumer to produce modified content;
   initiating transmission of the modified content to a first electronic device associated with the target consumer;
   in response to user input, marking a portion of the modified content for delivery to a second electronic device associated with the target consumer to generate a marked portion, wherein the marked portion content corresponds to a first portion of the modified content that was not displayed at the first electronic device, and wherein the user input indicates that the target consumer has not viewed the portion of the modified content; and
   initiating transmission of the marked portion of the second device, wherein the marked portion is distinct from a second portion of the modified content that was displayed at the first electronic device, and wherein the marked portion is not delivered to the first electronic device.

17. The computer-readable storage device of claim 16, wherein the modified content includes an audible cue that identifies a particular portion of the modified content.

* * * * *